United States Patent
Haffner

(10) Patent No.: US 7,952,064 B2
(45) Date of Patent: May 31, 2011

(54) DEVICE AND METHOD FOR PROCESSING AND/OR ANALYZING IMAGE INFORMATION REPRESENTING RADIATION

(75) Inventor: Ken Yves Haffner, Baden (CH)

(73) Assignee: ABB Research Ltd, Zurich (CH)

( * ) Notice: Subject to any disclaimer, the term of this patent is extended or adjusted under 35 U.S.C. 154(b) by 6 days.

(21) Appl. No.: 12/470,638

(22) Filed: May 22, 2009

(65) Prior Publication Data
US 2009/0289178 A1   Nov. 26, 2009

Related U.S. Application Data

(63) Continuation of application No. PCT/CH2006/000670, filed on Nov. 29, 2006.

(51) Int. Cl.
G01J 1/04 (2006.01)
G01J 1/42 (2006.01)
G01J 5/08 (2006.01)

(52) U.S. Cl. ............. 250/227.11; 250/216; 431/12; 431/75; 431/76

(58) Field of Classification Search ........ 250/227.21, 250/227.23, 227.24, 576, 227.11, 227.2, 250/227.28; 340/578; 356/213, 218, 477, 356/478, 479, 45; 706/23, 16, 25; 364/148.02; 431/12, 75, 76, 79, 78, 14
See application file for complete search history.

(56) References Cited

U.S. PATENT DOCUMENTS

| 4,411,519 A | 10/1983 | Tagami |
| 4,978,850 A * | 12/1990 | Nakamura et al. ....... 250/227.11 |
| 2001/0014436 A1 | 8/2001 | Lemelson et al. |
| 2008/0068704 A1 | 3/2008 | Schmidt et al. |

FOREIGN PATENT DOCUMENTS

| DE | 19710206 A1 | 9/1998 |
| GB | 2390675 A | 1/2004 |
| JP | 08049845 A * | 2/1996 |
| WO | WO 02/070953 A1 | 9/2002 |
| WO | WO 2006/000445 A1 | 1/2006 |

OTHER PUBLICATIONS

Uwe Schelinski et al.. Novel 3D-scanner based on electrostatically driven resonant micromirrors, 2005, p. 95-104, vol. 5873, Optical Scanning, Bellingham, WA.
Harald Schenk et al., A resonantly excited 2D-mirco-scanning-mirror with large deflection, 2001, p. 104-111, Elseivier Science B.V.
International Search Report (PCT/ISA/210) for PCT/CH2006/000670, completed Jul. 27, 2007.
Written Opinion (PCT/ISA/237) for PCT/CH2006/000670, completed Jul. 27, 2007.
International Preliminary Report on Patentability (PCT/IPEA/409) for PCT/CH2006/000670, dated Jun. 5, 2008.

* cited by examiner

Primary Examiner — Thanh X Luu
Assistant Examiner — Francis M Legasse, Jr.
(74) Attorney, Agent, or Firm — Buchanan Ingersoll & Rooney PC

(57) ABSTRACT

A method for processing and/or analyzing image information representing radiation in a spatially resolved manner using an optical system coupled to at least one detector includes the step of collecting said image information with said optical system using at least one micromechanical mirror moved such that the image information is scanned and coupled sequentially into the at least one detector.

20 Claims, 2 Drawing Sheets

DEVICE AND METHOD FOR PROCESSING AND/OR ANALYZING IMAGE INFORMATION REPRESENTING RADIATION

RELATED APPLICATION

This application claims priority as a continuation application under 35 U.S.C. §120 to PCT/CH2006/000670 filed as an International Application on Nov. 29, 2006 designating the U.S., the entire content of which is hereby incorporated by reference in its entirety.

TECHNICAL FIELD

A method and a device for processing and/or analyzing image information representing radiation are disclosed. In particular the disclosure relates to a device and a method for processing and/or analyzing radiation that is a result of a combustion process, so for example for a flame monitoring in a combustion chamber of a gas turbine.

BACKGROUND INFORMATION

A myriad of optical devices or optical systems are known to process and/or analyze image information representing radiation.

Devices and methods to analyze a combustion process in a combustion chamber in order to use the data obtained by said analysis to control the combustion process are known from prior art. Combustion may be any kind of combustion such as it is used in gas turbines, in waste incinerator plants or any other machines or plants. With such devices and methods it is possible to control the supply of fuel to be added to the combustion chamber in a manner that the combustion process reaches a high rate of efficiency. Hence such devices are used to optimize the efficiency factor of the combustion process.

It is a well known technique to use specific properties of reaction products of a combustion process for flame analysis and monitoring. Such combustion radicals and gases radiate and absorb light in a certain spectral range. As an example: for $C_2$ the wavelengths are in a range between 445 nm and 455 nm and for CH the wavelengths are between 420 nm and 440 nm.

GB 2 390 675 discloses an apparatus having an optical probe in the form of a lens for transmitting full image radiation into an imaging device. Such an imaging device may be a monochromatic CCD camera, a frame grabber and a computer. The parameters of the flame are then presented on the computer screen in a graphical or numerical manner in order to be visible for the user.

DE 197 10 206 discloses a further device for combustion analysis as well as for surveillance in a combustion chamber. Several beam splitters are used behind the lens system for full image capture in order to filter a certain spectral region of the radiation, which is of particular interest. The spectral region is then transmitted to a CCD sensor in order to be processed by a computer unit.

The use of a CCD sensor is a drawback of prior art devices, since the sampling rate of said CCD sensor is rather low. Such a low sampling rate has a negative influence on controlling the combustion process in terms of efficiency. Short time scale variation cannot be monitored reliably.

Since the combustion process in a combustion chamber of a gas turbine is carried out at very high temperatures, i.e. normally around 1200° C. to 1500° C., direct measurements inside the combustion chamber are not possible. A window between the combustion chamber and the device reduces said temperature significantly. Nevertheless the temperature on the window surface is still around 100° C. to 150° C. Due to said temperatures the use of optical elements such as objectives or beam splitters is a not a useful option.

In order to cope with high temperatures, the use of cooling systems has been proposed, e.g. in GB 2 390 675. However the use of a cooling system is rather costly in terms of installation and maintenance.

Another drawback are the optical losses of the optical systems used in devices of prior art. Furthermore it is a difficulty with devices of prior art to adjust the optical systems during maintenance or installation of the device. This usually requires professional personnel.

SUMMARY

A device is disclosed which can monitor an industrial (combustion) process in a highly effective manner. Such a device can have fewer optical losses than the known devices, at the same time showing a high sensitivity and higher recording speed.

A method for monitoring an industrial combustion process is disclosed comprising processing and/or analyzing image information, the image information representing the two dimensionally spatially resolved emission spectrum of a flame resulting from a combustion process in a combustion chamber, the method using an optical system coupled to at least two optical detectors, comprising the steps of collecting the image information by the optical system, by means of at least one micromechanical mirror, which is mechanically variably tiltable, such that the image information is scanned by the mirror, and coupling the image information sequentially into the at least two detector, wherein the optical system further comprises a lens and a fibre bundle with optical fibres, characterized by the steps of: arranging the at least one micromechanical mirror behind a window of the combustion chamber to separate the chamber from space in which the mirror is located, arranging the lens at a first end of the fibre bundle to couple the image information received from the micromechanical mirror into the fibre bundle as an optical signal, coupling the second end of said fibre bundle to the at least one detector to transmit the image information to the at least two detectors and connecting each of the detectors to a dedicated fibre, the detectors being sensitive to a certain frequency range and detecting organic radicals in order to characterize the combustion, and providing measured parameters from an analyzing unit as input data to a control circuit, and the control circuit controlling the supply of fuel or any other combustion material or combustion air.

A device for monitoring an industrial combustion process is disclosed comprising processing and/or analyzing image information, the image information representing two dimensionally spatially resolved emission spectrum of a flame resulting from a combustion process in a combustion chamber, which device comprises at least one optical system and at least two optical detector, wherein the optical system comprises a micromechanical mirror mechanically tiltable mounted to scan and to couple sequentially said image information into the at least two detectors, wherein the at least one micromechanical mirror is arranged behind a window of the combustion chamber to separate the chamber from space in which the mirror is located, the optical system further comprises a lens and a fibre bundle with at least one optical fibre, wherein said lens is arranged at a first end of the fibre bundle to couple the image information received from the micromechanical mirror into the fibre bundle as an optical signal, wherein the second end of said fibre bundle is coupled to the at least one detector to transmit the image information to the at least two detectors wherein each of the detector is connected to a dedicated fibre, the detectors are sensitive to a certain frequency range to allow the detection of organic radicals in order to characterize the combustion, and an analyzing unit provides measured parameters as input data to a control circuit that controls the supply of fuel or any other combustion material or combustion air.

BRIEF DESCRIPTION OF THE DRAWINGS

The drawings will be explained in greater detail by means of a description of an exemplary embodiment, with reference to the following figures.

DETAILED DESCRIPTION

Figure 1:
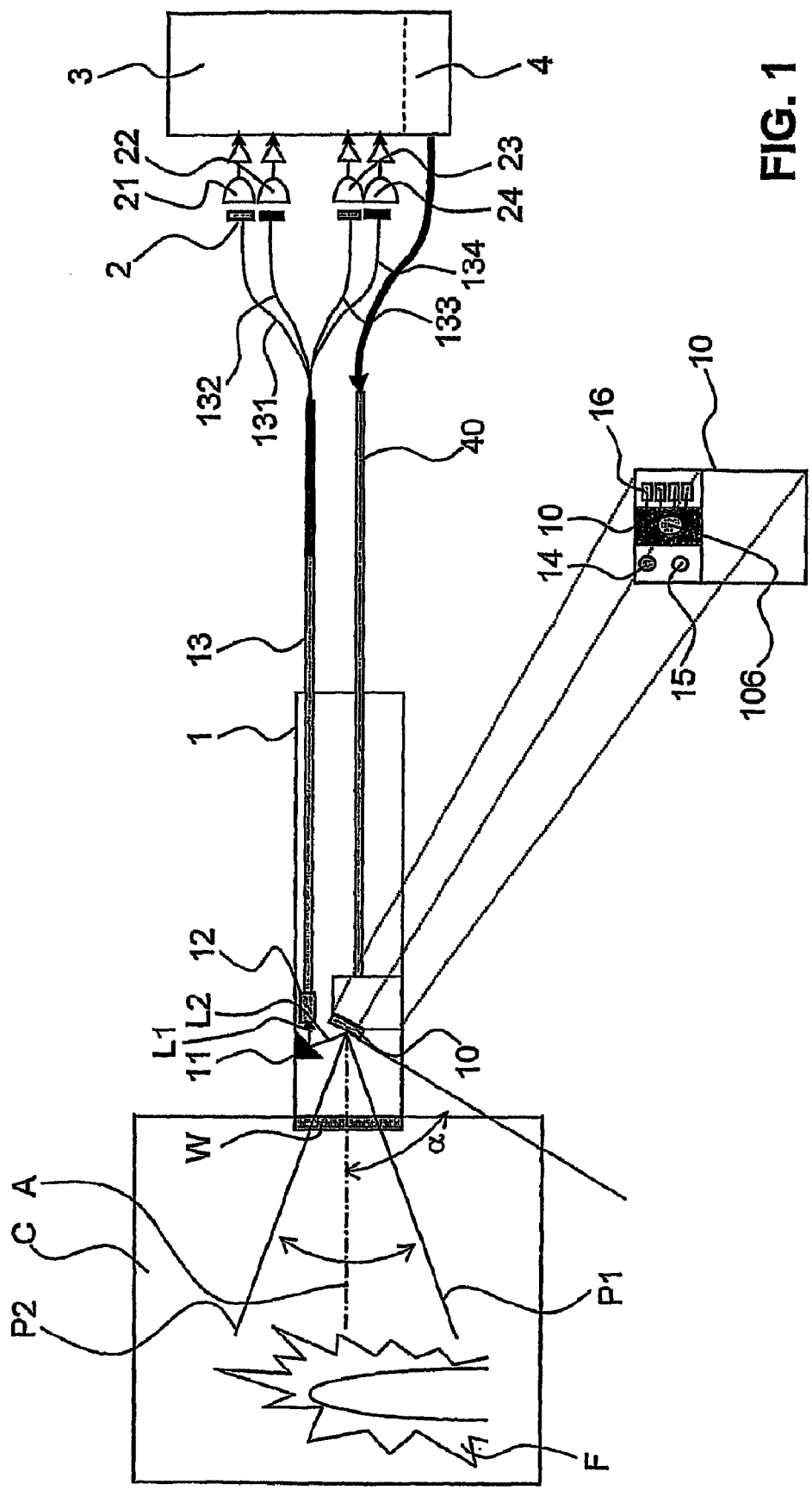
FIG. 1 shows a schematic view of a device according to an exemplary embodiment of the present disclosure.

Specifically, a method for processing and/or analyzing image information, the image information representing radiation in a spatially resolved manner, the method is proposed using an optical system coupled to at least one optical detector. According to the disclosure, the image information is collected by the optical system, by means of at least one micromechanical mirror. This micromechanical mirror comprises a micro mirror mounted thereon, which can be mechanically variably tilted during the image capturing process, such that the image information is scanned by the mirror and is sequentially coupled into the at least one detector.

As sequentially coupled a time-resolved sending of information will be understand in which the repetition of sending the same information at a later time is allowed.

While such micromechanical mirror so far are have only been used for irradiating a certain area in a spatially resolved manner using a monodirectional beam as input, it is presently proposed to use such a system in the reverse way. It was found that unexpectedly, the reverse action can easily be controlled, leads to a high sensitivity, enables fast data collection in particular if two-dimensional images are to be captured, and it was found that little optical components are necessary.

According to a first exemplary embodiment of the disclosure, the method is characterised in that the micromechanical mirror is tilted around two preferably orthogonal axes during the scanning process. This twin axis tilting can be carried out consecutively or simultaneously for capturing two-dimensional image information in a highly efficient way.

According to a further exemplary embodiment, the micromechanical mirror for the tilting motion is oscillated around an equilibrium or rest position. Preferably, if the micromechanical mirror is tilted around two orthogonal axes simultaneously, the oscillations about the two axes are phase shifted, leading to a Lissajous-type scanning of the two-dimensional image plane. Of course also different scanning strategies are possible, so the conventional line scanning, but also, for example for flame scanning, specific radial track scanning can be useful.

It is in addition to that preferred if the method further comprises the step of converting said image information into an analogue signal and/or into a digital signal by means of said at least one detector. The method may further comprise the step of analyzing said analogue signal or said digital signal by means of an analyzing unit comprising computer.

As already outlined above, are particularly useful field of application of the method is that the method is used to analyze the two dimensional spatially resolved emission spectrum of a flame resulting from a combustion process in a combustion chamber. The use of the micromechanical mirror in the above method in this field is particularly suited as such a micromechanical mirror is rather heat resistant.

According to a further exemplary embodiment of the method according to the disclosure, for different spectral ranges different detectors which are sensitive to different spectral ranges are used in parallel. This means, that the image as a scanned by the micromechanical mirror is coupled into an optical pathway which splits the optical information into separate paths, each of which is being analysed by a separate detector with a different sensitivity to a spectral range.

In particular for the monitoring of flames, but also for other applications, it can be useful if in addition to the spatially resolved data collection, in parallel a specific characteristic, for example the full radiation intensity, of the full image plane is measured. This is for example possible by using a silicon detector or a fibre coupled to a silicon detector which integrates the total flame emission.

The present disclosure furthermore relates to a device for processing and/or analyzing image information, the image information representing radiation in a spatially resolved manner. This device can be used to carry out the method as described above. The device comprises at least one optical system and at least one optical detector and it is in particular characterized in that the optical system comprises a micromechanical mirror mechanically tiltable mounted to scan and to couple sequentially said image information into the at least one detector.

According to a first exemplary embodiment, this device is further characterized in that the optical system comprises a lens and a fibre bundle with at least one optical fibre, wherein said lens is arranged at a first end of the fibre bundle to couple the image information received from the micromechanical mirror into the fibre bundle as an optical signal, and wherein the second end of said fibre bundle is coupled to the at least one detector to transmit the image information to the at least one detector. If several detectors which are sensitive to different spectral ranges are used, an equal number of optical fibres can be used within the fibre bundle for paralleling of the optical information provided by the lens. So it can be beneficial if there is provided at least one detector which is it sensitive to a specific spectral range only, wherein the at least one detector provides an analogue signal and/or digital signal corresponding to the intensity in the detected spectral range for processing by the analyzing unit.

Furthermore the present disclosure relates to the use of an optical system comprising at least one micromechanical mirror with a tiltable mounted micro-mirror thereof for transmitting spatially resolved image information in a time-resolved manner to at least one detector.

Referring to the drawings, which are for the purpose of illustrating the present exemplary embodiments of the disclosure and not for the purpose of limiting the same, FIG. 1 shows in a schematic way an exemplary embodiment of a device according to the present disclosure processing and/or analyzing image information representing radiation. Said radiation can result from the flame of a combustion process in a combustion chamber.

The device, which may also be designated as a scanning device is arranged behind a window W of a combustion chamber C, separating the combustion chamber from the space in which the device is located. The window W can be a sapphire window. Such a combustion chamber C may be a combustion chamber of a power station that is powered by fossil fuels, such as a combustion chamber of a gas turbine, or of a waste incineration plant. The combustion results in a flame F, which is being monitored by the scanning device according to the present disclosure. The results that are provided by the device may be used as parameters in order to detect the flame ignition and to control the supply of fuel or other combustible material, of combustion air, valve opening etc.

However, it should be noted that the image information may also be a result of a different process or a product. For example it is possible to use a scanning device according to the present disclosure to scan products in a production line in order to ensure quality of the products. Just to name one example: It may be possible to scan a printed circuit board to verify, if all components are mounted in a proper manner.

For the sake of simplicity of the present specification the term image information or image information representing radiation is equally being used in this specification. It is understood that said terms include any conceivable image and is by no means limited to the radiation image of a flame.

The device for processing and/or analyzing image information according to the present disclosure comprises an optical system 1, a processing unit 2, an analyzing unit 3 and a mirror control unit 4.

The optical unit or optical system 1 transfers the image information essentially from the location where said image information is being generated to the processing unit 2. According to the exemplary embodiment in FIG. 1 the image information resulting from the flame F is being transferred from behind the window W of the combustion chamber C to the processing unit 2.

The image information and the radiation information it represents characterizes the combustion process. The radiation has a spatially resolved emission in specific spectral regions i.e. in certain wavelength ranges. Therefore the image information captured from the flame can conveniently be used to monitor the efficiency and stability of the combustion process.

The processing unit 2 converts the optical signals into signals that are suitable to be processed by the analyzing unit 3. Such signals can be analogue signals or digital signals. It is understood that the computer must comprise an A/D-converter, if an analogue signal is provided.

The optical system 1 comprises at least one micromechanical mirror 10. Furthermore the optical system 1 comprises a deflection element 11, a lens 12, a fibre bundle 13, a silicon detector 14 and a light emitting diode 15. For illustrative purposes the mirror 10' is also shown outside the actual optical system 1 in FIG. 1. The optical system 1 comprises only a few optical elements, therefore the optical losses are kept that a minimum. Hence the image information can be transmitted in an accurate and sensitive manner.

It has to be noted that the use of the deflection element 11 and/or the lens 12 and/or the fibre bundle 13 and/or the silicon detector 14 and/or the light emitting diode 15 is optional.

The micromechanical mirror 10 deflects the image information as optical signal L1 to the deflection element 11. The optical signal L1 is then deflected by the deflection element 11 in order to provide an optical signal L2 to the lens 12. The lens 12 is arranged at the beginning or entry of the fibre bundle 13. Said fibre bundle 13 transmits the optical signal and therefore the image information to the analyzing unit 2. The micromechanical mirror may be a mirror according to WO 2006/000445. For the specific construction and mode of control of the micromechanical mirror, the disclosure of this document is explicitly included into the present specification. Other micromechanical mirrors may also be used.

In case the deflection element 11 is not present, it is possible that the micromechanical mirror 10 deflects the image information directly to the lens 12.

The micromechanical mirror 10 is arranged at a distance from the window W of the combustion chamber C. The micromechanical mirror 10 is used as a scanning mirror for spatially scanning the combustion process, i.e. the flame F in the combustion chamber and to couple the obtained two-dimensional image information into the optical system 1. Perpendicular to the window W of the combustion chamber C there is an axis A. The average or equilibrium position of the plane of the micromechanical mirror 10 is tilted with respect to the axis A with an angle α. Said angle α depends on the arrangement of the deflection element 11 and may be adjusted accordingly. Angle α can be around 45°, but may have other values.

As indicated in FIG. 1, the micromechanical mirror 10 covers a scan range in a first direction from a first line P1 to a second line P2. The angle between P1 and P2 is preferably 20°. Hence the micromechanical mirror 10 is able to scan an angle of plus/minus 10° from the middle axis A. Additionally the mirror surface may also be moveable in a second direction. Said second direction is perpendicular to the plane defined by P1 and P2. The scan range in the second direction can be equal to the first direction. Therefore the micromechanical mirror 10 scans the image information in a spatially resolved, two-dimensional manner and is therefore able to provide a two-dimensional image information representing said radiation in spatially resolved manner.

In further exemplary embodiments said angle between P1 and P2 may be larger or smaller than 20°. However this depends on the design of the micromechanical mirror 10. Said design may be adjusted according to the field of the application of the device according to the present disclosure.

Figure 3:
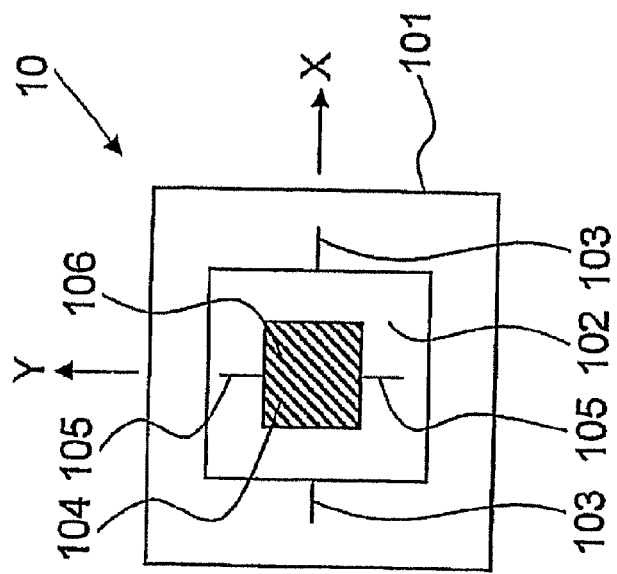
FIG. 3 shows a schematic view of the micromechanical mirror of FIGS. 1 and 2.

FIG. 3 shows the micromechanical mirror 10 in very schematic view. The mirror 10 comprises a frame 101 with a rectangular opening in which a first plate 102 is mounted. Said first plate 102 is connected to the frame by means of collinear axes 103. The first plate 102 is pivotable with respect to the frame 101 around the axis X. Thereby the axes 103 are torsionally deformed.

The first plate 102 itself also comprises a rectangular opening in which a second plate 104 is mounted. Said second plate 104 is connected to the first plate 102 by means of axes 105. Hence the second plate 104 is pivotable with respect to the first plate 102. Therefore the second plate 104 is pivotable around the axis Y. Thereby the axes 105 are torsionally deformed.

A mirror surface 106 is arranged on the second plate 104.

Therefore the mirror surface 106 pivotable around the axis X and the orthogonal axis Y. The mirror surface therefore allows to scan along two dimensions.

The mirror surface 106 can be applied onto the second plate 104 by means of a coating method, such as aluminium or any other suitable material. It is important that the used material is resistant to the high temperatures.

The mirror is actuated by an actuation voltage that is applied to the frame 101 and to the first plate 102 and/or to the second plate 104. As soon as the voltage crosses a certain threshold voltage the plates 102, 104 begin to move from a starting or equilibrium position to a deflected end position. Thereby the axes 103, 105 act as a torsion springs. The plates remain in said end position as long as the voltage is higher than said threshold voltage. As soon as the voltage crosses the certain threshold voltage again, the plates move back into the starting position due to the effect of the torsion spring. It is therefore possible to have a voltage that is applied in certain frequency in order to oscillate the mirror around the axes X and Y. Depending on the arrangement of the electrical connectors 16 for applying the voltage the first plate and/or the second plate pivot clockwise and counterclockwise around the axis X or Y, respectively.

The oscillation of the first plate 102 or the second plate 104 while being actuated can be sinusoidal. If both axes are actuated phase shifted, the mirror surface 106 describes a lissajous figure. The image information is being collected in spatially resolved manner and transmitted in a time-resolved manner. The data collection using phase shifted oscillations about two orthogonal axes allows a fast and comprehensive data collection over the full two-dimensional area while never losing an overview over the whole picture.

The mirror can be pivotable around two axes as it is described above. However depending on the application it may also be sufficient that the mirror is only pivotable around one axis, i.e. axis X or axis Y.

In order to control the motion of the micromechanical mirror 10, the frame 101, the first plate 102 and the second plate 103 are linked by means of electrical wires 40 to the mirror control unit 4 as it can be seen in FIG. 1. Said mirror control unit 4 is able to provide the voltage as it is described above.

Due to the use of a micromechanical mirror 10 as a scanner, it is possible to scan the image information with a high frequency. Therefore it is possible to cover the full two-dimensional scanning range with a high speed. Therefore crosstalk between images is prevented.

Figure 2:
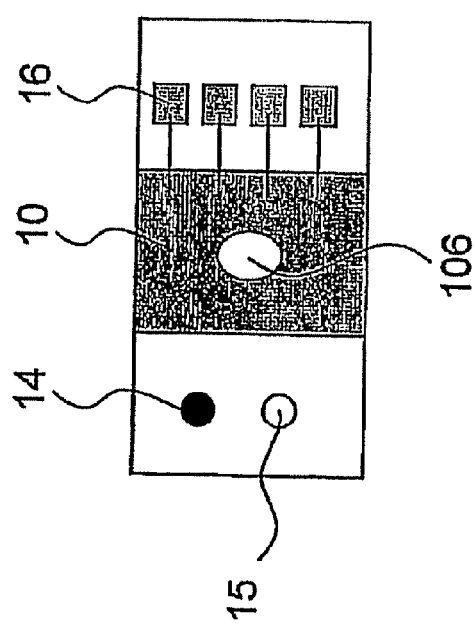
FIG. 2 shows a schematic view of a micromechanical mirror with additional features used in the device of FIG. 1.

FIG. 2 shows the mirror 10 with the mirror surface 106, the silicon detector 14, the light emitting diode 15 and the electrical connectors 16 in schematic view. The silicon detector 14 and the light emitting diode 15 are arranged on one side of the micromechanical mirror 10. On the other side of the micromechanical mirror 10 there are several electrical connectors 16 to actuate the electrical mirror. The electrical connectors 16 are therefore connected to the electrical wires 40.

The silicon detector 14 integrates the total flame emission or chemiluminescence. This gives information about the heat release fluctuation in correlation to acoustic pulsations. The detected signal by the silicon detector 14 is in a frequency bandwidth of a few kHz. Since CCD-Chips have a lower sampling rate it is not possible to detect such a signal by means of a CCD-Chip.

The signal provided by the detector is amplified and digitized, the digital data are (time domain) are processed in the frequency domain (FFT) where the acoustic frequencies can be recorded.

The light emitting diode 15 is provided for self-test purposes. The sapphire window has a high refractive index therefore the Fresnel reflexion induced by it's illumination can be use to test the all system, the mirror 10 and silicon detector 14.

For the description of the process, reference is made to FIG. 1. The mirror deflects the image information to the lens as optical signal L1 and L2.

The lens 12 couples said optical signal into the fibre bundle 13. The fibre bundle comprises at least one optical fibre. In the present exemplary embodiment the fibre bundle 13 comprises four optical fibres 131, 132, 133, 134. Each of said optical fibre transmits more or less the same image information or optical signal, respectively. The use of several optical fibres 131-134 is particularly interesting, because it allows a fast communication and gives a high flexibility between the scanning mirror 11 and the processing unit 2. Furthermore it is advantageous if several fibres are used, as the use of the scanning mirror 10 and the several optical fibres 131-134 allows collecting flame chemiluminescence images at different wavelengths by using single appropriate detectors. This means that each detector 131-134 detects more or less the same image information or optical signal, respectively, but each of the detectors is chosen to detect only a certain bandwidth of the spectral region, i.e. a certain frequency range or wavelength range. Preferably for each defined wavelength window or bandwidth window one appropriate detector is arranged. With other words the measurement with detectors 131-134, sensitive to a certain frequency range allow the detection of organic radicals e.g. OH*, CH*, $C_2$* of the fuel whereby combustion can be characterised. The processing unit 2 comprises several, here four, detectors 21, 22, 23, 24. Each of the detector is connected to a dedicated fibre 131-134 that provides the detector 21-24 with more or less the same optical signal.

The following table gives an overview of a possible division of the wavelength window:

| Detector: | Radical | Wavelength: | Half Width At Half-Maximum: |
|---|---|---|---|
| Detector 21 $\lambda 1$ | OH* | 310 nm | 20 nm |
| Detector 22 $\lambda 2$ | CH* | 430 nm | 20 nm |
| Detector 23 $\lambda 3$ | $C_2$* | 510 nm | 20 nm |
| Detector 24 $\lambda 4$ | | 550 nm | 20 nm |
| Further Detector $\lambda 5$ | | 950 nm | 50 nm |

The detectors that are able to detect a wavelength in the range of 310 nm to 470 nm are preferably GaAsP- or GaP-photodiodes. Detectors to detect a wavelength in the range of 470 nm to 1000 nm are preferably Si-photodiodes.

Due to the parallel split-up of the image information in terms of wavelength, it is possible to detect the optical signals in a faster manner as with a CCD-Chip. Therefore the same information will be kept, as if the scan had been carried out by a CCD-Chip. Furthermore several images representing said image information may be provided without loosing any resolution and therefore valuable data.

The detectors 21-24 provide electrical signals corresponding to the detected wavelength. Depending on the type of the detector an analogue signal or a digital signal will be provided. Said signals may be processed by the analyzing unit 3.

In case an analogue signal is being provided, the analyzing unit 3 comprises a frame grabber or an A/D-converter in order to convert the analogue signals that are provided by the detector unit 2 into digital signals for being processed by the computer.

The analyzing unit 3 can be a computer having suitable program code means and interfaces to process the electrical signals that are provided by the detectors 21-24. The computer or analyzing unit 3 may provide the measured parameters for a computer screen so that analysis of the flame F is possible by a user. Furthermore it is possible that the analyzing unit 3 provides the measured parameters as input data for the control circuit that controls the supply of fuel or any other combustion material, combustion air, etc. In further exemplary embodiments it is possible to transmit the measured data via a network (e.g. local area network; internet, wireless network) to a computer that is remote from the combustion chamber. This allows an arrangement of a control room for several combustion chamber C.

With the device according to the present disclosure is possible to derive further information from the measured parameters. Such further information may be the flame contours, flame position, kinetic of the flame and the state of the flame (on/off).

The flame position is particularly useful, since it allows to position the mirror accordingly in order to scan the whole flame F. The mirror controller 4 is provided to control the movements of the mirror. Thereby the mirror controller 4 is connected by means of electrical wires 40 to the mirror. The micro-electromechanical actuators need a voltage between 10 to 100 Volts in order to be actuated.

A further advantage of a device according to the present disclosure is that it is down scaleable in terms of size. This means that an implementation in application specific integrated circuit (ASIC) is possible without a high effort.

According to the present disclosure there is also disclosed a method for processing and/or analyzing image information representing radiation in a spatially resolved manner. The radiation can result from a flame F of a combustion process. Alternatively the radiation may be a result of any other application. The method uses an optical system 1 according to the present disclosure that is coupled to at least one detector 21-24.

The method comprises at least a step of collecting said image information with said optical system. Thereby at least one micromechanical mirror 10 is used. The micromechanical mirror 10 is moved such that the image information is coupled sequentially into the at least one detector 21-24.

The method further comprises the step of converting said image information into an analogue signal or into a digital signal by means of said at least one detector (21-24).

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

| LIST OF REFERENCE NUMERALS | |
|---|---|
| 1 | optical system |
| 2 | processing unit |
| 3 | analyzing unit |
| 4 | mirror control unit |
| 10 | mirror |
| 11 | deflection element |
| 12 | lens |
| 13 | fibre bundle |
| 14 | silicon detector |
| 15 | white light emitting diode |
| 16 | electrical connectors |
| 21-24 | optical detectors |
| 40 | electrical wires |
| 101 | frame |
| 102 | first plate |
| 103 | axis |
| 104 | first plate |
| 105 | axis |
| 106 | mirror surface |
| 131 | optical fibre |
| 132 | optical fibre |
| 133 | optical fibre |
| 134 | optical fibre |
| L1; L2 | optical signals |
| F | flame |
| C | combustion chamber |
| W | window |

What is claimed is:

1. A method for monitoring an industrial combustion process wherein image information represents a two dimensionally spatially resolved emission spectrum of a flame resulting from a combustion process in a combustion chamber, the method comprising:
    collecting the image information by an optical system having at least one micromechanical mirror, which is mechanically variably tiltable, such that the image information is scanned by the mirror;
    coupling the image information sequentially into at least two detectors, wherein the optical system includes a lens and a fiber bundle with optical fibers, and the at least one micromechanical mirror is arranged behind a window of the combustion chamber to separate the chamber from space in which the mirror is located;
    coupling the image information received from the micromechanical mirror into a first end of the fiber bundle as an optical signal;
    transmitting, via a second end of said fiber bundle coupled to the at least two detectors, the image information to the at least two detectors, each of the detectors being connected to a dedicated fiber and being sensitive to a certain frequency range for detecting organic radicals in order to characterize the combustion process in an analyzing unit, and
    providing measured parameters from the analyzing unit as input data to a control circuit, the control circuit controlling the supply of fuel or any other combustion material or combustion air.

2. The method according to claim 1, comprising:
    deriving from the measured parameters further information as flame contours, flame position, kinetic of the flame and on/off state of the flame.

3. The method according to claim 1, comprising:
    transmitting the measured data via a network to a computer that is remote from the combustion chamber.

4. The method according to claim 1, wherein the micromechanical mirror is tilted around two orthogonal axes consecutively or simultaneously for capturing the image information as two-dimensional image information.

5. The method according to claim 1, comprising:
    oscillating the micromechanical mirror for the tilting motion around an equilibrium position, wherein when the micromechanical mirror is tilted around two orthogonal axes simultaneously, oscillations about the two axes can be phase shifted.

6. The method according to claim 1,
    converting said image information into at least one of an analog and a digital signal by said detectors.

7. The method according to claim 1, wherein for different spectral ranges different detectors are used in parallel.

8. The method according to claim 1, comprising:
    measuring, in parallel to the spatially resolved collection of image information, at least one of a specific characteristic, and full radiation intensity, of a full image plane.

9. The method according to claim 2, comprising:
    transmitting the measured data via a network to a computer that is remote from the combustion chamber.

10. The method according to claim 3, wherein the micromechanical mirror is tilted around two orthogonal axes consecutively or simultaneously for capturing the image information as two-dimensional image information.

11. The method according to claim 4, comprising:
    oscillating the micromechanical mirror for the tilting motion around an equilibrium position, wherein when the micromechanical mirror is tilted around two orthogonal axes simultaneously, oscillations about the two axes can be phase shifted.

12. The method according to claim 5, comprising: converting said image information into at least one of an analog signal and a digital signal by said detectors.

13. The method according to claim 6, comprising: analyzing said analog signal or said digital signal by the analyzing unit comprising a computer.

14. The method according to claim 6, comprising: analyzing said analog signal or said digital signal by the analyzing unit comprising a computer.

15. The method according to claim 13, wherein for different spectral ranges different detectors are used in parallel.

16. The method as claimed in claim 7, wherein a wavelength of at least one of 310 nm±20 nm, 430 nm±20 nm and 510 nm±20 nm and/or 550 nm±20nm is measured.

17. The method according to claim 7, comprising: measuring, in parallel to the spatially resolved collection of image information, at least one of a specific characteristic and a full radiation intensity of a full image plane is measured.

18. The method as claimed in claim 8, wherein a wavelength of at least one of 310 nm±20 nm, 430 nm±20 nm, 510 nm±20nm, and 550 nm±20 nm is measured.

19. A device for monitoring an industrial combustion process using image information representing a two dimensionally spatially resolved emission spectrum of a flame resulting from a combustion process in a combustion chamber, which device comprises:

at least one optical system and at least two optical detectors, wherein the optical system includes a micromechanical mirror mechanically tiltable and mounted to scan and to couple sequentially said image information into the at least two detectors, and wherein the at least one micromechanical mirror is arranged behind a window of the combustion chamber to separate the combustion chamber from space in which the mirror is located;

a lens and a fiber bundle with at least one optical fiber, wherein said lens is arranged at a first end of the fiber bundle to couple the image information received from the micromechanical mirror into the fiber bundle as an optical signal, a second end of said fiber bundle is being coupled to the at least two detectors to transmit the image information to the at least two detectors, and wherein each detector is connected to a dedicated fiber and is sensitive to a specific frequency range to allow detection of organic radicals in order to characterize the combustion; and an analyzing unit which provides measured parameters as input data to a control circuit that controls a supply of at least one of a combustion material and combustion air.

20. The device according claim 19, wherein at least one of the detectors is sensitive to a specific spectral range only, wherein the at least one detector provides at least one of an analog signal and digital signal corresponding to intensity in the specific frequency range for processing by the analyzing unit.

\* \* \* \* \*